(12) United States Patent
Gangal et al.

(10) Patent No.: US 12,524,426 B2
(45) Date of Patent: Jan. 13, 2026

(54) SYSTEMS AND METHODS FOR DATA EXTRACTION FROM SCANNED DOCUMENTS POWERED BY ARTIFICIAL INTELLIGENCE

(71) Applicant: Fidelity Information Services, LLC, Jacksonville, FL (US)

(72) Inventors: Shrikant Gangal, Pune (IN); Abhinay Soundankar, Pune (IN); Tushar Tilwankar, Pune (IN); Devendra Soni, Jaipur (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

(21) Appl. No.: 18/540,984

(22) Filed: Dec. 15, 2023

(65) Prior Publication Data
US 2025/0165491 A1  May 22, 2025

(30) Foreign Application Priority Data
Nov. 21, 2023  (IN) .............................. 202311079048

(51) Int. Cl.
*G06F 16/00* (2019.01)
*G06F 16/22* (2019.01)
*G06F 16/25* (2019.01)

(52) U.S. Cl.
CPC ........ *G06F 16/254* (2019.01); *G06F 16/2282* (2019.01)

(58) Field of Classification Search
CPC .......................... G06F 16/254; G06F 16/2282
See application file for complete search history.

(56) References Cited

U.S. PATENT DOCUMENTS

2007/0011134 A1* 1/2007 Langseth .............. G06F 16/254
2014/0369602 A1* 12/2014 Meier ................. G06V 30/412
382/182

(Continued)

OTHER PUBLICATIONS

Fang, J., et al. Table Header Detection and Classification. Proceedings of the AAAI Conference on Artificial Intelligence, 26(1), pp. 599-605 [online], [retrieved on Apr. 24, 2025]. Retrieved from the Internet <URL: https://cdn.aaai.org/ojs/8206/8206-13-11733-1-2-20201228.pdf> (Year: 2012).*

(Continued)

*Primary Examiner* — Syed H Hasan
(74) *Attorney, Agent, or Firm* — FINNEGAN, HENDERSON, FARABOW, GARRETT & DUNNER LLP

(57) ABSTRACT

Consistent with disclosed embodiments, systems, devices, and methods for extracting data from scanned documents using artificial intelligence may be provided. Disclosed embodiments may involve obtaining at least one document associated with at least one entity and identifying at least one table located on the at least one document. Disclosed embodiments may involve extracting text within the identified at least one table based on predicted coordinates of the at least one table and reproducing the at least one table using the extracted text by: identifying at least one header of the at least one table; identifying a final row of the at least one table; identifying, using a sliding window technique, columns of the at least one table; and presenting the extracted text in rows and columns. Disclosed embodiments may store the reproduced at least one table in a database.

18 Claims, 12 Drawing Sheets

(56) References Cited

U.S. PATENT DOCUMENTS

| | | | |
|---|---|---|---|
| 2020/0151444 A1* | 5/2020 | Price | G06V 30/416 |
| 2020/0210746 A1* | 7/2020 | Mesmakhosroshahi | G06V 30/413 |
| 2020/0334249 A1* | 10/2020 | Canim | G06F 16/2458 |
| 2021/0240976 A1* | 8/2021 | Tiyyagura | G06V 30/414 |
| 2021/0406533 A1* | 12/2021 | Arroyo | G06F 40/177 |
| 2022/0335240 A1* | 10/2022 | Smock | G06N 3/045 |
| 2023/0055391 A1* | 2/2023 | Jain | G06F 16/358 |
| 2023/0065915 A1* | 3/2023 | Berestovsky | G06V 30/1448 |
| 2023/0260309 A1* | 8/2023 | Jamshidikhezeli | G06V 30/414 382/229 |

OTHER PUBLICATIONS

Notification of Transmittal of the International Search Report and Written Opinion of the International Search Authority for corresponding application No. PCT/US2024/056605 date of mailing Dec. 31, 2024.

* cited by examiner

100

110
Statements 20XX

120

130
132

140

150
152

160
162

Example Corporation Balance Sheets

|  | December 31, | |
|---|---:|---:|
| ASSETS | 2022 | 2021 |
| Current assets | | |
|     Cash and cash equivalents | $ 2,200 | $ 6,000 |
|     Short-term investments | 10,000 | 3,000 |
|     Accounts receivable – net | 39,500 | 42,700 |
|     Other receivables | 1,000 | 1,300 |
|     Inventory | 31,000 | 29,000 |
|     Supplies | 3,800 | 4,000 |
|     Prepaid expenses | 1,500 | 1,000 |
|         Total current assets | 89,000 | 87,000 |
| Investments | 36,000 | 24,000 |
| Property, plant & equipment – net | | |
|     Land | 5,500 | 5,500 |
|     Land Improvements | 6,500 | 6,500 |
|     Buildings | 180,000 | 180,000 |
|     Equipment | 201,000 | 211,000 |
|     Less, accumulated depreciation | (56,000) | (45,000) |
|         Property, plant & equipment - net | 337,000 | 358,000 |
| Intangible assets | | |
|     Goodwill | 105,000 | 105,000 |
|     Other intangible assets | 200,000 | 100,000 |
|         Total Intangible assets | 305,000 | 205,000 |
| Other assets | 3,000 | 1,000 |
| Total assets | $ 77,0000 | $ 675,000 |
| LIABILITIES | | |
| Current liabilities | | |
|     Short-term loans payable | $ 5,000 | $ 10,,000 |
|     Current portion of long-term debt | 15,000 | 40,000 |
|     Accounts payable | 20,900 | 38,000 |
|     Accrued compensation and benefits | 8,500 | 7,000 |
|     Income taxes payable | 6,100 | 9,000 |
|     Other accrued liabilities | 4,000 | 5,000 |
|     Deferred revenues | 1,500 | 1,000 |
|         Total current liabilities | 61,000 | 110,000 |
| Long-term liabilities | | |
|     Notes payable | 20,000 | 250,000 |
|     Bonds payable | 375,000 | - |
|     Deferred income taxes | 25,000 | 20,000 |
|         Total long-term liabilities | 420,000 | 270,000 |
| Total liabilities | 481,000 | 380,000 |
| STOCKHOLDER'S EQUITY | | |
| Common stock | 110,000 | 110,000 |
| Retained earnings | 220,000 | 205,000 |
| Accum other comprehensive income | 9,000 | 5,000 |
| Less: Treasury stock | (50,000) | (25,000) |
|     Total stockholders' equity | 289,000 | 295,000 |
| Total liabilities & stockholders' equity | $ 770,000 | $ 675,000 |

*FIG. 2A*

Example Corporation
Income Statement

|  | 2022 | 2021 | 2020 |
|---|---|---|---|
| Nets sales | $ 3,980 | $ 3,750 | $ 3,400 |
| Cost of sales | 3,100 | 2,950 | 2,700 |
| Gross profit | 880 | 880 | 700 |
| Selling, general and administrative expenses | 640 | 590 | 510 |
| Operating income | 240 | 210 | 190 |
| Interest expense | 20 | 15 | 15 |
| Loss on sale of equipment | 5 | — | 4 |
| Income before income taxes | 215 | 195 | 171 |
| Income tax expense | 50 | 40 | 36 |
| Net income | $ 165 | $ 155 | $ 135 |

*FIG. 2B*

Example Corporation
Statement of Cash Flows
For the year ended December 31, 20XX

| | |
|---|---:|
| Cash flows from operating activities | $230,000 |
| Net income | |
| *Adjustments to reconcile net income to net cash provided by operating activities:* | |
| Depreciation and amortization | 63,000 |
| Loss on sale of equipment | 15,000 |
| *Changes in current assets and liabilities:* | |
| Increase in accounts | (21,000) |
| Decrease in prepaid expenses | 3,000 |
| Decrease in accounts payable | (28,000) |
| Net cash provided by operating activities | 262,000 |
| Cash flows from investing activities | |
| Capital expenditures | (300,000) |
| Proceeds from sale of equipment | 40,000 |
| Net cash used for investing activities | (260,000) |
| Cash flows from financing activities | |
| Proceeds from issuing debt | 20,000 |
| Dividends paid | (110,000) |
| Net cash provided by financing activities | 90,000 |
| Net increase in cash during the year | 92,000 |
| Cash at the beginning of the year | 101,000 |
| Cash at the end of the year | $193,000 |

*FIG. 2C*

Example Corporation
Income Statement ← 810

| | 2022 | 2021 | 2020 |
|---|---|---|---|
| Net sales | $ 3,980 | $ 3,750 | $ 3,400 |
| Cost of sales | 3,100 | 2,950 | 2,700 |
| Gross profit | 880 | 800 | 700 |
| Selling, general and administrative expenses | 640 | 590 | 510 |
| Operating income | 240 | 210 | 190 |
| Interest expense | 20 | 15 | 15 |
| Loss on sale of equipment | 5 | – | 4 |
| Income before income taxes | 215 | 195 | 171 |
| Income tax expense | 50 | 40 | 36 |
| Net income | $ 165 | $ 155 | $ 135 |

| ASSETS | 2022 |
|---|---|
| Total current assets | $ 89,000 |
| Investments | $ 36,000 |
| Property, plant & equipment - net | $ 337,000 |
| Total Intangible assets | $ 305,000 |
| Other assets | $ 3,000 |
| Total assets | $ 770,000 |

LIABILITIES

| | |
|---|---|
| Total current liabilities | $ 61,000 |
| Total long-term liabilities | $ 420,000 |
| Total liabilities | $ 481,000 |

STOCKHOLDER'S EQUITY

| | |
|---|---|
| Total liabilities & stockholders' equity | $ 770,000 |

INCOME

| | |
|---|---|
| Net income | $ 165,000 |

CASH FLOWS

| | |
|---|---|
| Net cash provided by operating activities | $ 262,000 |
| Net cash used for investing activities | $ 260,000 |
| Net cash provided by financing activities | $ 90,000 |
| Net increase in cash during the year | $ 92,000 |
| Cash at the beginning of the year | $ 101,000 |
| Cash at the end of the year | $ 193,000 |

*FIG. 9*

SYSTEMS AND METHODS FOR DATA EXTRACTION FROM SCANNED DOCUMENTS POWERED BY ARTIFICIAL INTELLIGENCE

TECHNICAL FIELD

The present disclosure generally relates to computerized systems and methods for processing documents and providing extraction of data generated by artificial intelligence. In particular, embodiments of the present disclosure relate to inventive and unconventional systems related to the rapid recognition of tables and extraction of data from tabular data using artificial intelligence.

BACKGROUND

Traditional systems and methods for scanning documents may be limited to the mere recognition of text or images. However, traditional systems and methods are unable to accurately ingest structured, semi-structured, or unstructured documents to interpret, extract, and/or reproduce key information for use in later electronic processing. As a non-limiting example, financial statements may include or involve structured, semi-structured, or unstructured documents that include various tables with key information to be interpreted, extracted, and/or reproduced for later electronic processing.

Financial statements are written records that convey the business activities and the financial performance of a company. Financial statements are often audited by government agencies, accountants, and firms for tax, financing, and/or investing purposes. However, financial statements do not follow any industry standard templates or formats (i.e., the format of financial statements may vary between corporations or between years).

Financial spreading involves systematically extracting key financial information from financial statements. In traditional systems and methods, financial spreading typically begins with receipt of financial statements by a credit analyst. The credit analyst then scans through pages of financial statements to identify relevant sections and begins manually mapping financials to a structured format.

As an example, in commercial lending, spreading customer financials has been the most fundamental aspect and has been key for quality of credit decisioning and underwriting. However, as discussed above, in traditional systems and methods, spreading customer financials is a predominantly manual and time-consuming process. As the process is manual and resource intensive, it adds cost and is prone to errors. This can compromise the quality of strategic business decision making, underlining the want for a higher degree of spread accuracy.

As discussed above, in traditional systems and methods, a credit analyst manually reviews financial documents and marks areas within identified pages where financial information is present. After locating these areas of interest, the credit analyst manually maps external terms to internal accounts for calculation purposes. However, financial statements do not follow standard templates or formats, and it is inefficient and costly for credit analysts to review these statements to identify relevant sections and map financials to a structured format.

While it may be possible to build systems and methods to perform financial spreading without manual intervention from a credit analyst, such an undertaking is technologically difficult and time consuming. Existing systems and methods, for example, may be unable to (i) accurately identify relevant tables (e.g., balance sheets, income statements, statements of cash flows) and may be further unable to (ii) demarcate the columns, identify relevant columns, and extract data from the identified relevant tables and map the extracted data to a desired structured format. Existing systems simply are not built to perform these functions, especially in the context of financial statements.

Therefore, there is a need for improved systems and methods for the rapid recognition of relevant financial tables in financial statements, extraction of data from the financial tables, and mapping of the extracted data to structured formats.

SUMMARY

One aspect of the present disclosure is directed to a computer-implemented system. The computer-implemented system may comprise a non-transitory computer readable medium configured to store instructions and at least one processor configured to execute the instructions to perform operations. The operations may comprise obtaining, from at least one data store, at least one document associated with at least one entity. The operations may further comprise identifying, using an object detection algorithm, at least one table located on the at least one document and extracting, using optical character recognition, text within the identified at least one table based on predicted coordinates of the at least one table. The object detection algorithm may be trained using a dataset including tables from a plurality of other documents. Additionally, the operations may comprise reproducing the at least one table using the extracted text by: identifying at least one header of the at least one table; identifying a final row of the at least one table; identifying, using a sliding window technique, columns of the at least one table; and presenting the extracted text in rows and columns. Furthermore, the operations may comprise storing the reproduced at least one table in a database.

Another aspect of the present disclosure is directed to a computer-implemented method. The method may comprise obtaining, from at least one data store, at least one document associated with at least one entity. In some embodiments, the method may further comprise identifying, using an object detection algorithm, at least one table located on the at least one document and extracting, using optical character recognition, text within the identified at least one table based on predicted coordinates of the at least one table. The object detection algorithm may be trained using a dataset including tables from a plurality of other documents. Additionally, the method may comprise reproducing the at least one table using the extracted text by: identifying at least one header of the at least one table; identifying a final row of the at least one table; identifying, using a sliding window technique, columns of the at least one table; and presenting the extracted text in rows and columns. Furthermore, the method may comprise storing the reproduced at least one table in a database.

BRIEF DESCRIPTION OF THE DRAWINGS

The accompanying drawings, which are incorporated in and constitute a part of this specification, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

FIGS. 2A-2C depict examples of tables of interest, consistent with embodiments of the present disclosure.

FIG. 8 depicts an example display of a table and a corresponding table overlay, consistent with embodiments of the present disclosure.

FIG. 9 depicts an example of a reproduced table, consistent with embodiments of the present disclosure.

DETAILED DESCRIPTION

Figure 1:
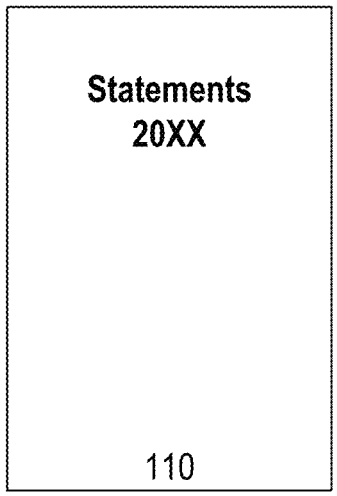
FIG. 1 depicts an example of statements, consistent with embodiments of the present disclosure.
Figure 1:
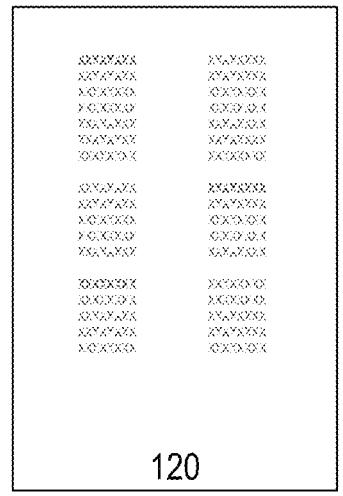
Figure 1:
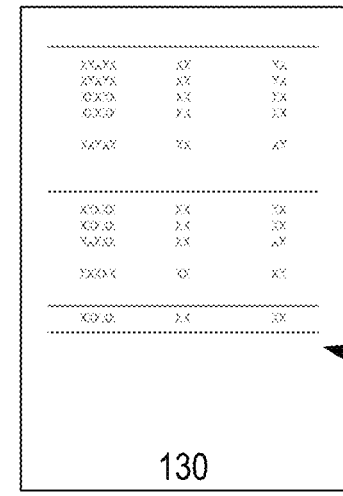
Figure 1:
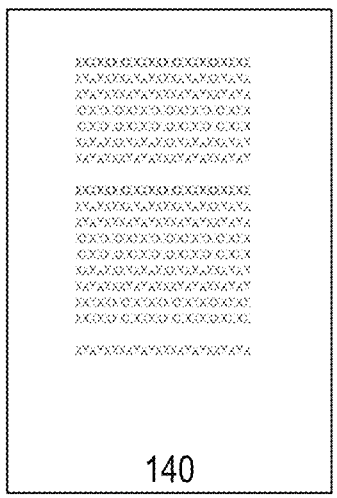
Figure 1:
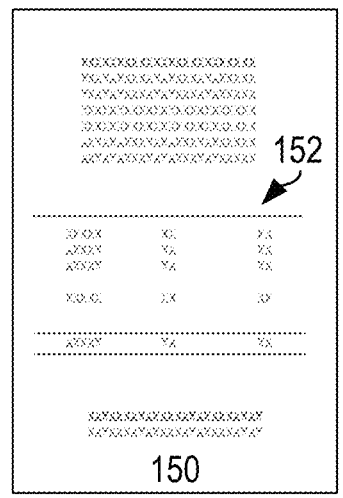
Figure 1:
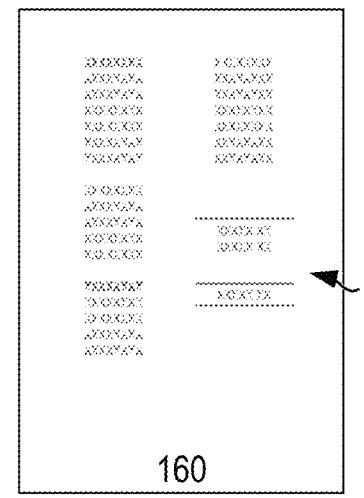

Embodiments of the present disclosure relate to computer-implemented systems and methods for data extraction, including computer-implemented systems and methods for performing data extraction from scanned documents using artificial intelligence. Consistent with disclosed embodiments, a computer-implemented system may comprise at least one processor and a non-transitory computer readable medium configured to store instructions. The at least one processor may be configured to execute the instructions and may perform operations such as those discussed herein. Furthermore, the at least one processor may be configured to execute the instructions offline, such that the at least one processor is not required to be connected to a wireless, wired, or cloud network to perform any combination of the operations discussed herein. The methods, operations, and steps in accordance with the teachings herein may be performed by a computer specially constructed or programmed to perform the described functions.

As discussed herein, disclosed embodiments may provide technical or technological improvements over traditional systems and methods of data extraction by using artificial intelligence to, for example, identify tables located in a structured, semi-structured, or unstructured document; extract information located in the identified tables; and map the extracted information to a structured format for further electronic processing and/or display. For example, tables that contain similar types of data or information may use different formats and/or terms to present the similar types of data or information. Embodiments of the present disclosure may identify tables that contain similar types of data or information and map the data or information stored/located in the table to a standard table or format. Thus, some embodiments may standardize (or normalize) tables that present similar data or information. Traditional systems and methods simply are not equipped to perform such efficient and accurate identification of tables; extraction of relevant data/text; and reproduction/mapping of tables to structured formats as embodiments presented herein.

One example of a scanned document, consistent with embodiments of the present disclosure, may include financial statements or documents. Embodiments of the present disclosure may relate to computer-implemented systems and methods for performing financial data extraction from scanned financial documents using artificial intelligence. As discussed herein, financial statements may relate to records of the financial activities and financial position of a corporation, business, person, or other entity. It is to be understood that financial statements may include or pertain to financial documents, financial records, or any other manner of recording financial information. Non-limiting examples of financial documents or information included in financial statements may include profit and loss statements, balance sheets, cash-flow statements, tax returns, accounts receivable/accounts payable (aging reports), and notes to accounts/financial statements. Systems and methods consistent with disclosed embodiments may scan financial statements of, for example, a corporation; identify tables of interest; extract data from the tables of interest; and map the extracted data to structured formats. The structured formats may be useful for calculation (e.g., calculating a corporation's financial position/activity) or comparison (e.g., comparing a corporation's financial position/activity across different years) purposes. The calculation or comparison, or other further processing activity, may be performed by the same system or other system(s). Examples used herein pertain to financial statements and documents for discussion purposes. It is to be understood that the disclosed systems and methods may be used for and/or apply to scanned documents of any form that include tables.

FIG. 1 depicts an example of statements 100. The statements in FIG. 1 may be financial in nature, but in other embodiments may represent other kinds of statements having data organized in particular methodologies (e.g., tables). As shown in FIG. 1, financial statements 100 may comprise multiple pages 110, 120, 130, 140, 150, 160, each page including information related to a corporation's financial activities. Furthermore, as shown in pages 130, 150, 160, financial statements 100 may include various financial tables 132, 152, 162. As shown in FIG. 1, financial statements 100 may be unstructured documents in that they are free-form and/or do not have a set structure (shown by some pages having two columns, other pages having one column, some pages having text and tables, etc.). It is contemplated that financial statements, and/or any other kinds of statements, may be structured or semi-structured documents. Structured documents may include or pertain to documents that have a fixed format. Semi-structured documents may include or pertain to documents that have a fixed set of data, but no fixed format for the data.

Embodiments of the present disclosure may scan financial statements 100 to identify and extract relevant data from tables of interest (e.g., tables 132, 152, 162) using systems and methods discussed herein. The extracted data from tables 132, 152, 162 may be mapped to structured formats for financial calculation purposes. In some embodiments, structured formats may include or pertain to formats or layouts of data that promote the efficient evaluation of the data stored in the structured formats. For example, a structured format may include an industry standard table with headers using industry standard terms. This may promote an efficient comparison of extracted financial data across different years of a single corporation, between different corporations during a single year, and/or between different corporations across different years. Example processes and operations for mapping extracted data to structured formats (e.g., reproducing tables using extracted data or text) are discussed further below.

FIGS. 2A-2C depict examples of tables of interest. FIG. 2A illustrates an example balance sheet of an example corporation, the balance sheet including assets, liabilities, and stockholder's equity groupings. The assets, liabilities, and stockholder's equity groupings may be further split into rows representing various aspects of each grouping, and each aspect may include a corresponding (or associated) monetary value. Furthermore, as shown in FIG. 2A, in some embodiments, tables may include multiple columns (e.g., 2022, 2021) under a parent column (e.g., December 31). Systems and methods discussed herein may be equipped to identify and handle such column structures. FIG. 2B illustrates an example income statement of an example corporation. As shown in FIG. 2B, the income statement of a corporation may include various aspects, such as net sales and cost of sales, and a corresponding (or associated) monetary value. The income statement may also include various columns, each representing a different year (e.g., 2022, 2021, 2020). FIG. 2C illustrates an example statement of cash flow of an example corporation. The statement of cash flow may include various aspects, such as cash flows from operating activities, investing activities, and financing activities, each having a corresponding (or associated) monetary value. Although various numbers of rows and columns are represented in each example shown in FIGS. 2A-2C, it is to be understood that tables of interest (such as balance sheets, income statements, and statements of cash flow) are not limited to the number of rows and columns discussed and shown herein. Indeed, it is to be understood that tables of interest may include any number of rows and columns and that systems and methods of the present disclosure may be adapted to handle and perform the operations and steps discussed herein regardless of the number of rows and columns in a table of interest.

Figure 3:
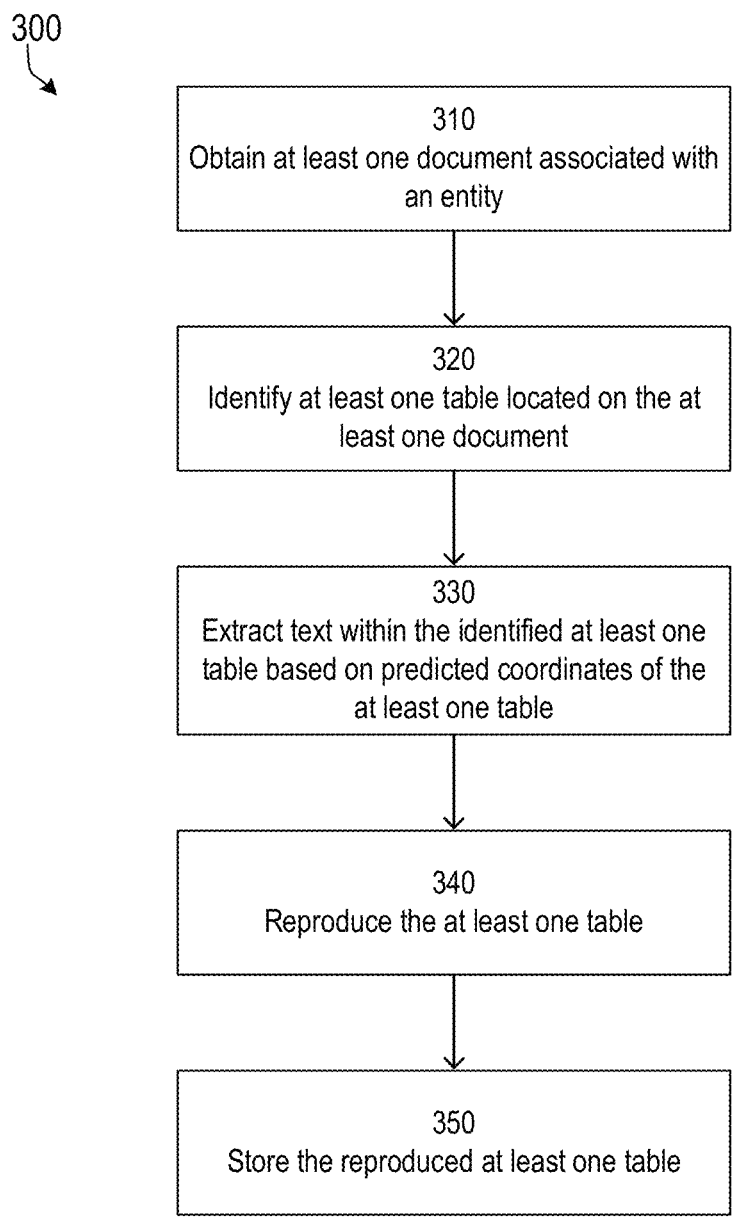
FIG. 3 depicts a flowchart of an example method for data extraction from documents powered by artificial intelligence, consistent with embodiments of the present disclosure.

FIG. 3 depicts a flowchart of an example method 300 for data extraction from financial documents powered by artificial intelligence. As discussed above, methods in accordance with the teachings herein may be performed by a computer specially constructed or programmed to perform the described functions. For example, method 300 may be implemented electronically, such as by at least one processor, and may occur over a network that is wired, wireless, or both wired and wireless. Aspects of methods disclosed herein may additionally, or alternatively, be implemented using non-electronic means. In a broadest sense, disclosed methods are not limited to particular physical and/or electronic instrumentalities (except where specified in the present disclosure or in the claims presented herein), but rather may be accomplished using many different instrumentalities. In some embodiments, the steps of methods disclosed herein may be performed by features of disclosed systems (e.g., by at least one processor of a system disclosed herein) or may be implemented as operations performed when instructions contained in a non-transitory computer readable medium are executed (e.g., by at least one processor).

Method 300 may include obtaining at least one document associated with an entity, such as a corporation (step 310). As used herein, a data store may pertain to a repository for storing and managing collections of data. Non-limiting examples of data stores include databases, files, and email correspondence. Furthermore, databases may pertain to a collection of data that is managed by a database management system. Non-limiting examples of documents include financial statements, invoices, or any piece of written, printed, or electronic matter. In some embodiments, the at least one document may include at least one table or other form of tabular data. As discussed herein, the obtaining of the at least one document may pertain to electronically uploading electronic matter to a system (e.g., the example system shown in FIG. 7). For example, the document may be an electronic file that is uploaded into a system for data extraction. As another example, the document may include printed matter that is scanned, and the scanned document may be uploaded into a system for data extraction. As yet another example, a system for data extraction may locate an electronic document or scanned document that is located or stored on a network (e.g., cloud system, network drive, shared network).

Embodiments of the present disclosure may identify at least one table or tabular data located on the at least one document using, for example, an object detection algorithm (step 320). The object detection algorithm may be trained using a dataset including tables from a plurality of other documents. For example, systems and methods may train the object detection algorithm on table boundary dataset(s) specific to financial statements using pre-identified or pre-located tables and table coordinates from other financial statements. It is contemplated that systems and methods of the present disclosure may train the object detection algorithm using table boundary dataset(s) specific to any type of document, including—but not limited to—invoices, journal articles, journal publications, or any other document that may include tables or tabular data, depending on the type of document that is designed to be uploaded. For example, when the at least one document is a financial statement, the object detection algorithm may be trained on table boundary dataset(s) specific to financial statements. As another example, when the at least one document is an invoice, the object detection algorithm may be trained on table boundary dataset(s) specific to invoices.

In some embodiments, a Single Shot Detector (SSD) architecture may be implemented as the object detection algorithm. The Single Shot Detector architecture may be referred to as a Single Shot Detector (SSD) model or approach. It is to be understood that the terms SSD architecture, SSD model, and SSD approach, as used herein, are interchangeable and refer to SSD architecture object detection algorithms. Furthermore, although SSD architectures are discussed for exemplary purposes, it is to be understood that any object detection algorithm (including any type/form of convolutional neural network, recurrent neural network, feed-forward neural network, deep learning algorithm), alone or in any combination, may be used. It is also to be understood that any architecture or algorithm for high quality image classification may be used in place of or in addition to the algorithms discussed herein.

An SSD architecture may include or pertain to a feed-forward convolutional neural network used for image classification and/or object detection. The SSD architecture may include two components: a backbone model and an SSD head. The backbone model may include a pre-trained image classification network (e.g., trained on a large image classification dataset) to extract features of, for example, a document that is imported, uploaded, or otherwise obtained. The SSD head may include a number of convolutional layers (e.g., one or more convolutional layers) added to the backbone model. The SSD head may detect various objects in, for example, the document, and output bounding boxes over the detected objects. As an example, in an SSD model, each input document may be divided into grid of various sizes. At each grid, the SSD may perform a detection and may assign a score to each grid that reflects how well an object (e.g., a table) matches in the particular grid. The SSD architecture may apply a non maximum suppression (e.g., a computer vision method that selects a single entity out of many overlapping entities) to obtain a final detection from the set of overlapping detections.

Thus, the SSD approach may be based on a feed-forward convolution neural network that produces a fixed-size collection of bounding boxes and scores for the presence of object class instances in those bounding boxes, followed by a non-maximum suppression step to produce the final detections. Furthermore, because the SSD architecture uses a single network, the SSD architecture may have a fast inference speed and promote a near real-time application of disclosed systems and methods.

As discussed above, in some embodiments, the response, or output, from the SSD model may include bounding boxes around an identified table, or table region, on the at least one document. The bounding boxes may include a location of the table, or table region, on the document in coordinates using various units such as, but not limited to, pixels. The response, or output, from the SSD model (or other object detection algorithm) may be consumed by a component that is responsible for filtering the data that resides within the table boundaries.

In some embodiments, as shown in FIG. 3, and as discussed briefly above, embodiments of the present disclosure may extract the data or text within the identified table, or table region, based on predicted coordinates of the at least one table (step 330). The predicted coordinates may include units (e.g., pixels) that describe the location (e.g., four corners) of a bounding box surrounding a detected table or table region. In some embodiments, the extraction of the text or data may be performed using optical character recognition (OCR) responses (such as Tesseract OCR). In other embodiments (for example, if a table or table region is unable to be detected or does not exist on the at least one document), text or data of the entire document may be extracted using OCR.

Method 300 may filter out the data from the OCR of data that lies within the predicted table area (predicted using, for example, the SSD model described above). For example, the OCR response may return coordinates and text for each individual word in the table separate from the image. Thus, in some embodiments, individual words that are determined to belong to the same block or sentence may be merged. The merging may involve first calculating a mean character width (in, for example, pixels) for each detected horizontal line, where the coordinates provided by the OCR response may include a line number for each detected word. If a distance (in, for example, pixels) between two words is less than or equal to the horizontal line's (e.g., the horizontal line that the two words lie in) mean character width, then the words may be merged. The merging may be performed on each consecutive word determined to have a distance that is less than or equal to the mean character width (from the merged words) in each horizontal line.

In some embodiments, after words are merged, the data from the OCR response may be further filtered based on the predicted table's coordinates or parameters. Said another way, embodiments of the present disclosure may evaluate and adjust the predicted table's coordinates or parameters to ensure that the table and relevant data/text on the table is captured. For example, if a table's left coordinate boundary intersects with text (e.g., the middle of a word), then the intersecting text may be added to the table data. Furthermore, in some embodiments, to ensure that text outside of a table, or table region, that is not relevant to the table is not included in the extracted tabular data/text, text that is detected to be greater than a certain distance (e.g., 30 pixels) away from a table boundary and/or outside a table boundary region may be ignored or filtered out of the table data.

In some embodiments, the pre-filtered or pre-validated predicted table boundaries may exclude rows from the top of a table (e.g., header rows) or may include extra rows to the top of a table (e.g., rows that do not exist on the table). In these cases, embodiments of the present disclosure may identify if a valid header is present within a first number of rows (e.g., first two rows) of a table. If valid header rows are found inside the tabular data, then the extra rows above the identified header row may be removed. If no valid header rows are identified within the table data, then the filtered OCR data or text may include a line number less than the minimum line number present in the table data and reverse iterate the filtered OCR data until a line containing a valid header row is found. For example, if no valid header rows are identified within the table data, then embodiments of the present disclosure may increase the size of the predicted table coordinates (or bounding box) by adding a row of space above the previously predicted table boundary, detecting/determining if the added row of space contains a valid header row, and (i) if it does contain a valid header row (or valid header row information), adjust the predicted table coordinates (or parameters) to include the row, or (ii) if it does not contain a valid header row (or valid header row information), continue the process of adding a row of space and detecting/determining if the added row contains a valid header row until a valid header row is found. Headers or header rows may be identified/validated using natural language processing, as discussed further below.

Similarly, in some embodiments, the pre-filtered or pre-validated predicted table boundaries may exclude rows from the bottom of a table or it may include extra rows at the bottom of a table. To remove potential rows that do not belong to a table, or table region, the last column of the row from the bottom of the table may be analyzed to determine if it includes data of a non-numeric data type. If the last column of the row from the bottom of the table includes data of a non-numeric data type, then the row may be removed from the potential table coordinates or parameters and the analysis may be performed on the row above the previously analyzed row. If the last column of the row from the bottom of the table includes data of a numeric data type, then the row may be determined to be the bottom, last, or final row of the table. The determination based on data type (non-numeric or numeric) may be based on the assumption that data of the last row of a financial statement (or any other relevant document with tables or tabular data) contains numeric information in the last column. In some embodiments, if rows are missing from the table, embodiments of the present disclosure may iterate over OCR data by rows and add rows of space to the predicted table boundaries until the last column of the last row is determined to be data of a numeric data type. In other embodiments, embodiments of the present disclosure may add rows of space to the predicted table until the last column of the added row is determined to include data of a non-numeric data type, and the row before (above) the added row may be determined to be the last row.

Consistent with embodiments of the present disclosure, as shown in FIG. 3, systems and methods may reproduce the at least one table (step 340) and store the reproduced at least one table in a database (step 350). The reproduction of the at least one table may involve the identification or determination of at least one header and a final row of the table by systems/methods, as discussed above. Furthermore, in some embodiments, the reproduction of the at least one table may further involve systems/methods identifying, using a sliding window technique, columns of the at least one table. In some embodiments, the sliding window technique may involve calculating a mean character width for each row in the identified table. Systems/methods may generate and set a vertical band (or detection line) at the minimum left coordinate of the identified table and set the vertical band to "slide forward," or move forward toward the right coordinate of the identified table in step- or pixel-wise fashion. Systems/methods may move the vertical band forward until it finds a configurable column boundary threshold. The configurable column boundary threshold may be determined by a certain (predetermined) number of blank spaces. A number of detected blank spaces that is equal to or exceeds the certain (predetermined) number of blank spaces may be determined by systems/methods to be a column boundary, and the table elements prior to (to the left of) the vertical band (or detection line) and/or the column boundary may be determined by systems/methods to be a single column. Systems/methods may repeat this process until the band reaches the maximum right coordinate of the identified table. In some embodiments, systems/methods may ignore the first one or more rows of the identified table when calculating column span (or using the sliding window technique to determine or identify columns in the identified table), as they may be assumed to be header rows. In some tables, header rows may span multiple columns, and thus may be excluded in the determination/identification of columns (and their boundaries) using the sliding window technique. In some embodiments, the number of rows to ignore may be identified or determined by embodiments of the present disclosure by looping through the last element of each line in table data to find a valid header row. The first line number to not include a valid header row may be determined to be the first row that will be included in the column boundary determination. Said another way, rows determined to include a valid header row or header information may be ignored by embodiments of the present disclosure in the column boundary determination. Furthermore, in some embodiments, once columns (and column boundaries) are identified and assigned to elements in the table data, systems/methods may identify the header rows and/or multiple header rows, such as "December 31" in FIG. 2A.

Embodiments of the present disclosure may then present the extracted text in rows and columns. The identified table coordinates or parameters, header rows, final row of the table, and column boundaries may provide a framework for extracting the data/text of the identified table and presenting it in rows and columns (or other structured formats).

Figure 4:
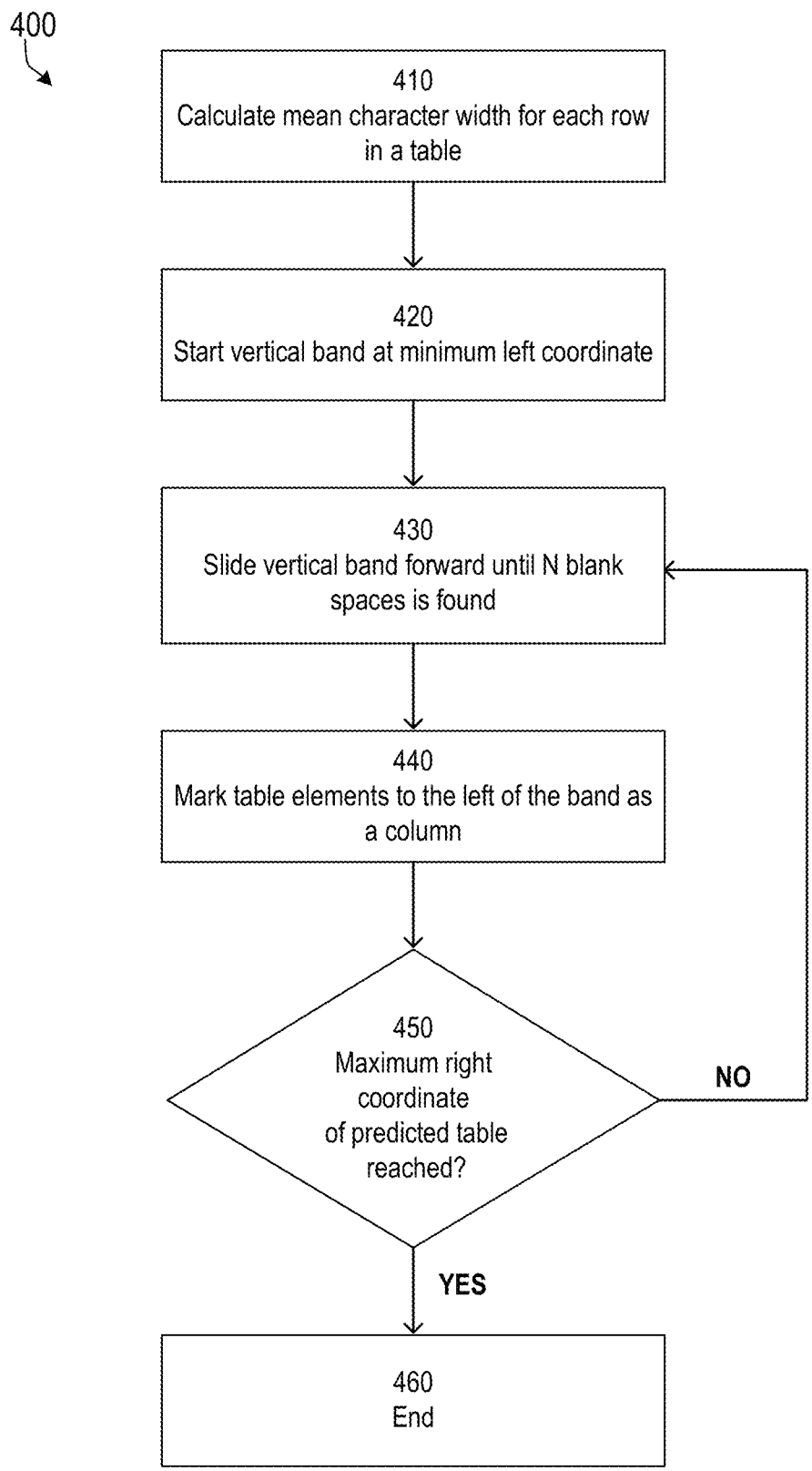
FIG. 4 depicts a flowchart of an example of a sliding window technique, consistent with embodiments of the present disclosure.

FIG. 4 depicts a flowchart of an example of a sliding window technique. As discussed above, a sliding window technique may involve calculating a mean character width for each row—or line—in a predicted table or table region (step 410); starting or establishing a vertical band at a minimum left coordinate of the predicted table or table region (step 420); sliding the vertical band forward—or toward the right—until a certain or predetermined (N) number of blank spaces is found (step 430); marking table elements to the left of the band at the location where a certain or predetermined (N) number of blank spaces is found as a column (step 440); and evaluating/analyzing if the vertical band has reached a maximum right coordinate of the predicted table or table region (step 450). As shown in FIG. 4, if the vertical band has not reached the maximum right coordinate of the predicted table or table region, then the vertical band may continue to slide forward until the next predetermined (N) number of blank spaces is found (step 430). When the vertical band reaches the maximum right coordinate of the predicted table or table region, this may indicate that the columns of the table or table region have been identified and the sliding window technique may end (step 460). It is contemplated that the sliding window technique may be performed consecutively on any number of tables within a document or between documents.

Furthering the discussion above with respect to the adjustment of the coordinates of the predicted table or table region (e.g., adjustment of table boundaries, adjustment of table boundary coordinates) and the identification of header rows, in some embodiments, systems/methods may use natural language processing (NLP) to identify or validate headers or header rows in the predicted table or table region. As used herein, natural language processing may pertain to processing natural language datasets (e.g., text corpora or speech corpora) using rule-based and/or probabilistic machine learning (or artificial intelligence) approaches. These processes may involve implementing semantic similarity. For example, some embodiments of the present disclosure may implement natural language processing techniques (based on semantic similarity) using word vectors or word embeddings, as shown in FIGS. 5A-5B.

As discussed herein, word vectors or word embeddings may include or pertain to mathematical representations of a meaning of a word. For example, training datasets may be fed to a system and the system may use these training datasets to establish relationships between words that have similar meaning or are used in similar contexts by determining, for example, how often words appear next to each other or how often particular words are used interchangeably. In some embodiments, word vectors or word embeddings may represent words as multidimensional continuous floating-point numbers where semantically similar words are mapped to proximate points in geometric space. The present disclosure makes reference to word vectors and word embeddings in discussing, e.g., examples of natural language processing techniques used herein. It is to be understood that the two terms (word vectors and word embeddings) are interchangeable in this context, and that references to word vectors or vectors also pertain to word embeddings or embeddings, and vice versa.

Figure 5A:
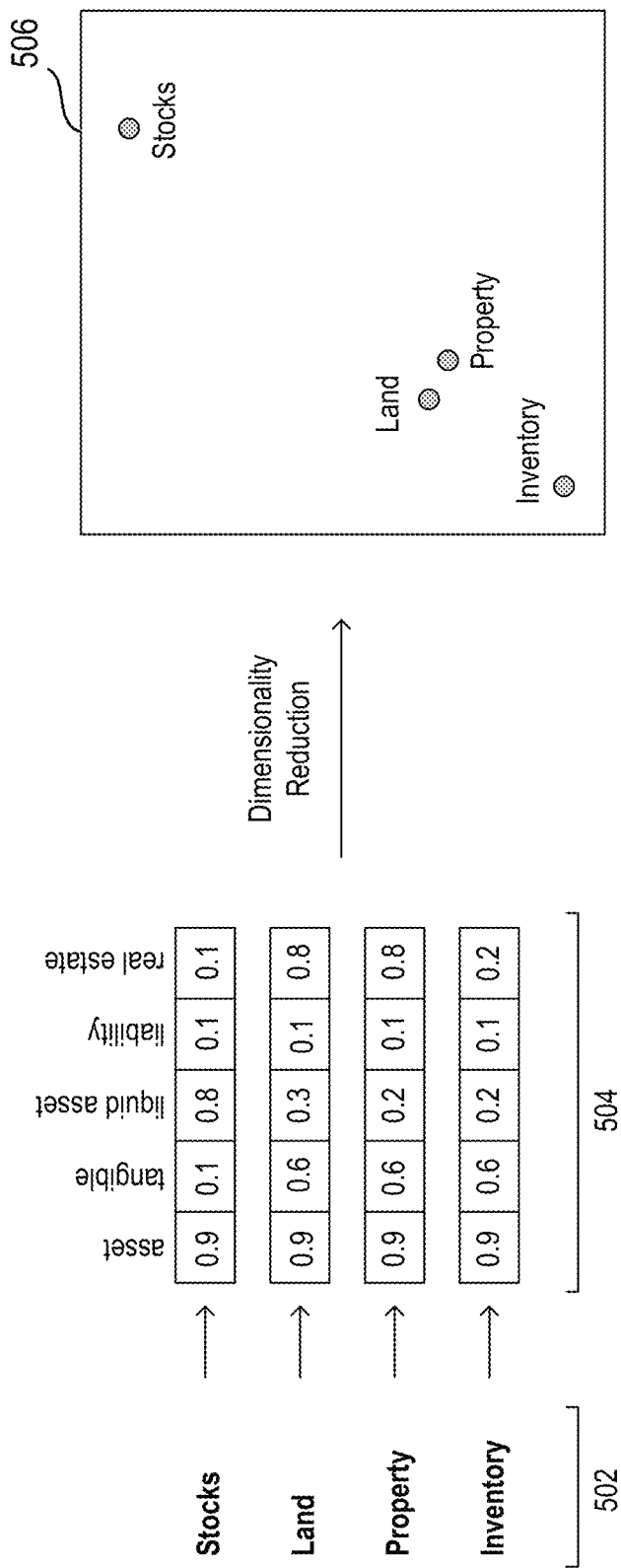
FIG. 5A illustrates an example conversion of words into word vectors or word embeddings, consistent with embodiments of the present disclosure.

FIG. 5A illustrates an example conversion of words into word vectors or word embeddings. As shown in FIG. 5A, words 502 (e.g., stocks, land, property, inventory) may be converted into vectors 504. Each element in vectors 504 may be a number or weight based on an association of the word with various other words (e.g., asset, tangible, liquid asset, liability, real estate). The association may be based on, for example, context determined by a system trained using training datasets, as discussed above. Furthermore, in some embodiments, the vectors 504 may undergo a dimensionality reduction from 5-dimensional (5D) to 2-dimensional (2D). A visual interpretation 506 of locations of each word vector in 2D may illustrate similarity between words 502 based on spatial proximity. For example, as shown in FIG. 5A, the words "land" and "property" may be determined to be similar based on a lesser distance between (or closer proximity between) their vectors/embeddings 504. Additionally, or alternatively, the word "stocks" may be determined to be less similar to the word "property" than the word "land" is to the word "property." In some embodiments, the similarity between two words (and in some embodiments, phrases or sentences) may be calculated via matrix calculation involving the vectors/embeddings 504 (e.g., without a dimensionality reduction and/or a visual interpretation 506).

Figure 5B:
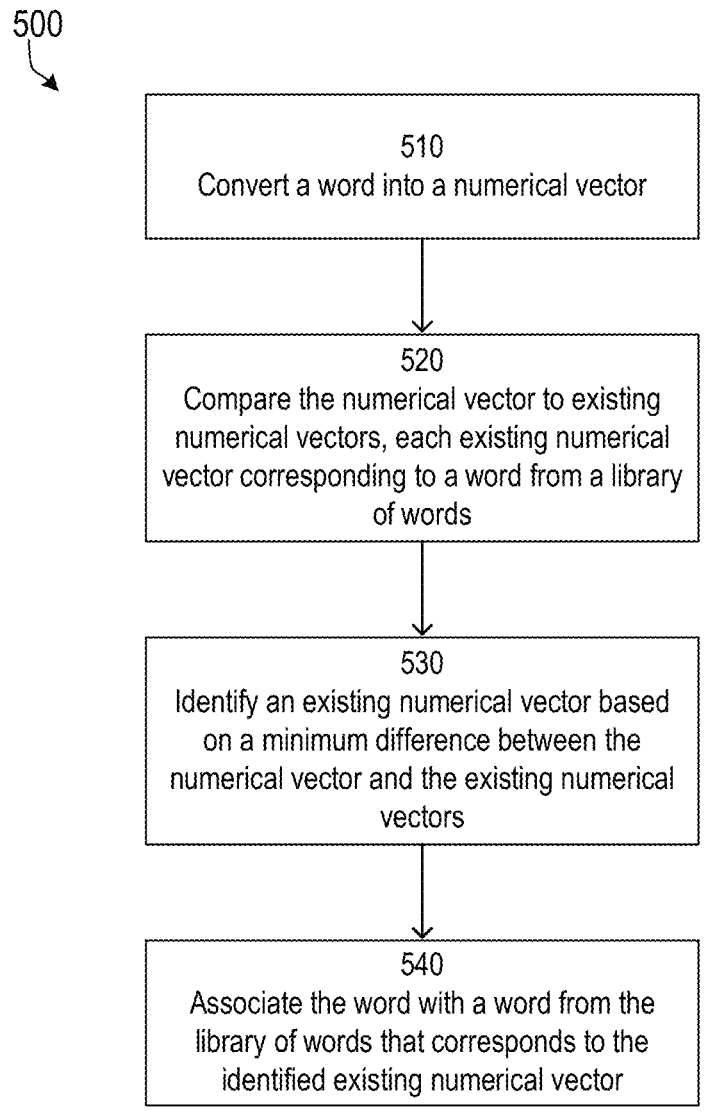
FIG. 5B depicts a flowchart of an example natural language processing technique, consistent with embodiments of the present disclosure.

FIG. 5B depicts a flowchart of an example natural language processing technique. As shown in FIG. 5B, the natural language processing technique 500 may involve converting a word, a phrase, or a sentence into a numerical vector (step 510). For example, with reference to FIG. 5A, the word "land" may be converted into a numerical vector. The words "stocks," "property," and "inventory" may be common header words and have already been previously converted into numerical vectors, and their numerical vectors may be stored in a database or a library of words. The numerical vector associated with "land" may be compared to the existing numerical vectors associated with "stocks," "property," and "inventory" (step 520). As shown by example in visual interpretation 506, a numerical vector associated with the term "property" may be identified based on a minimum difference between the numerical vector associated with "land" and the numerical vector associated with the term "property" (step 530). The term "land" may then be associated with the term "property" (step 540).

The use of natural language processing techniques, such as the technique/process described with respect to FIGS. 5A-5B, may allow embodiments of the present disclosure to determine, based on meaning, the most similar word, phrase, or sentence to a word, phrase, or sentence in a header row of the predicted table or table region. Furthermore, embodiments of the present disclosure may determine a column associated with a particular header or header row to include data of a type associated with the identified/associated common header word.

Although natural language processing techniques are discussed above with respect to headers or header rows and words, phrases, or sentences associated with headers of, for example, financial tables, it is contemplated that the natural language processing techniques discussed herein may be implemented in any row, word, phrase, or sentence identified in and/or extracted from a predicted or identified table/table region. Additionally, or alternatively, although words, phrases, and sentences are discussed above, it is contemplated that the natural language processing techniques and headers/header rows discussed herein may include numbers or symbols, and the same analyses may be performed on these numbers or symbols. Furthermore, although the identification/validation of headers or header rows is discussed herein with respect to the use of natural language processing, it is contemplated that any method of identifying key words and/or their equivalents may be used to identify/validate headers or header rows in extracted tabular data/text.

Figure 6:
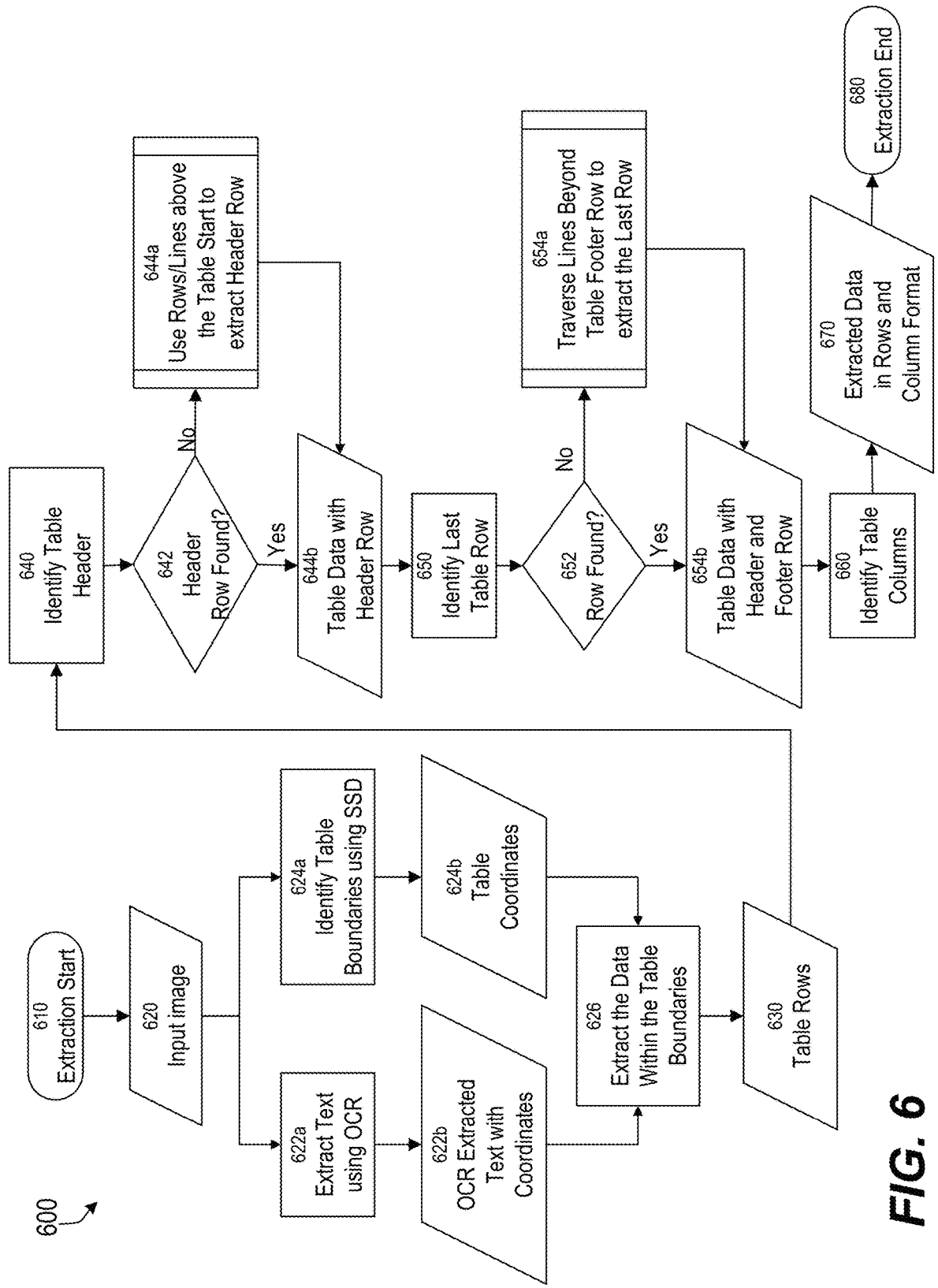
FIG. 6 depicts a block diagram of an example method for data extraction from financial documents powered by artificial intelligence, consistent with embodiments of the present disclosure.

FIG. 6 depicts a flowchart of a high-level method for data extraction from financial documents powered by artificial intelligence. As shown in FIG. 6, data extraction may begin (step 610) with the input of an image or document (step 620) into, for example, a system for data extraction. Non-limiting examples of images or documents may include PDFs, JPEGs, PNGs, and/or information stored in other file formats. The input of an image or document may include the import of the image or document into the system via electronic means such as—but not limited to—the scanning of a physical image or document into an electronic format (e.g., PDF, JPEG, PNG) and the upload of the electronic format of the image or document into the system.

After the input of an image or document (step 620), systems/methods may perform extraction of text (step 622*a*) and identification of table boundaries (step 624*a*) simultaneously. The systems/methods may extract text within the entire image or document using optical character recognition (OCR) (step 622*a*), and the extracted text may include or be associated with coordinates identifying locations of the extracted text in the image or document (step 622*b*). The coordinates identifying locations may include associating a coordinate (e.g., in pixel coordinates, cartesian coordinate, etc.) with a location of each word in the image or document. Systems/method may simultaneously (as shown in FIG. 6), identify table boundaries using an SSD approach (step 624*a*), as described above, and identify or output table coordinates (step 624*b*) based on the identified table boundaries. As an example, table coordinates may include pixel coordinates of each corner (e.g., top right corner, top left corner, bottom right corner, bottom left corner) of the identified table. Additionally, or alternatively, the table coordinates may include cartesian coordinates of each corner of the identified table. Although described and shown by example in FIG. 6 as occurring simultaneously, it is contemplated that systems/methods may perform extraction of text (step 622*a*) and the identification of table boundaries (step 624*a*) in a stepwise fashion such that one step/operation precedes the other. Furthermore, in some embodiments, systems/methods may forego steps related to extracting text of the entire image/document (e.g., steps 622*a* and 622*b*).

Following the extraction of text using OCR (steps 622*a* and 622*b*) and the identification of table boundaries and coordinates (steps 624*a* and 624*b*), systems/methods may extract the data within the identified table boundaries (step 626). To do so, systems/method may identify rows of the identified table (e.g., based on horizontal line numbers and/or detected lines of text) (step 630). Then, systems/methods may identify or validate table headers (step 640) using the techniques discussed above. For example, in some embodiments, as shown in FIG. 6, embodiments of the present disclosure may evaluate whether a header row is found (step 642). If a header row is not found, the embodiments discussed herein may use rows or lines above the determined start or top of the predicted table to determine if one or more of the rows or lines above the determined start or top of the predicted table are header rows. The system may then extract the header row(s) (step 644*a*). Consistent with some embodiments discussed herein, the identification of a header row may involve an iterative process. If a header row is found, the header row may be identified as a table header (step 644*b*) and the systems/methods may begin to identify the last table row (step 650) using, for example, techniques discussed further above.

Embodiments of the present disclosure may evaluate whether the last row is found (step 652) consistent with techniques, methods, or processes discussed above. For example, if the last row is not found, systems/method may traverse lines beyond the originally identified table footer row to extract a last row (step 654*a*). Consistent with some embodiments discussed herein, the identification of a last row of the table may involve an iterative process. If the last row is found, the header and footer rows may be identified (step 654*b*) in the table and systems/method may begin identifying table columns (step 660) using techniques discussed further above (e.g., sliding window technique). By identifying the header and footer rows instead of, for example, identifying all rows of a table or table region, the systems/methods discussed herein may detect and extract data from tables more efficiently without compromising detection/extraction accuracy. Embodiments of the preset disclosure may then extract the data within the identified table boundaries in a tabular format (e.g., rows and column format) (step 670) and the extraction of the tabular data may then end (step 680).

Figure 7:
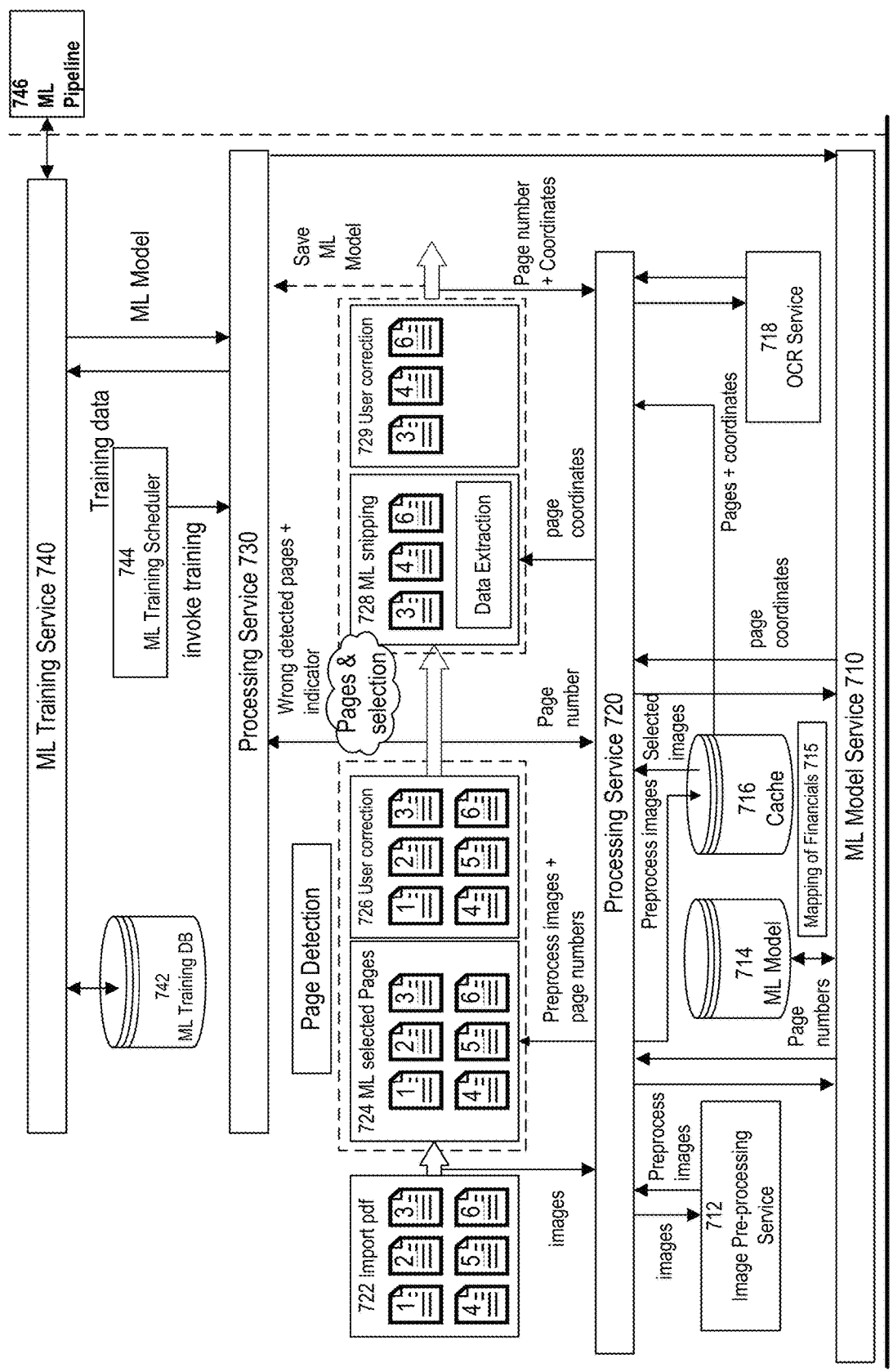
FIG. 7 depicts a diagram of an example system for data extraction from documents powered by artificial intelligence, consistent with embodiments of the present disclosure.

FIG. 7 depicts a diagram of an example system for data extraction from documents powered by artificial intelligence. As shown in FIG. 7, a microservices based architecture may be employed in some embodiments of the present disclosure. Various microservices (e.g., Image Pre-processing Service 712, Machine Learning (ML) Training Service 740, Processing Services 720 and 730, ML Model Service 710, Optical Character Recognition (OCR) Service 718) may be implemented within a single system or be implemented as two or more separate systems in synchronous or asynchronous communication with each other to perform various functions, operations, or steps discussed above. In some embodiments, the microservices based architecture shown in FIG. 7 may be implemented on a single device (e.g., computer, mobile device, etc.). In other embodiments, the microservices based architecture shown in FIG. 7 may be implemented across multiple devices, and the devices may be in synchronous or asynchronous communication with each other via, for example, a wired or wireless network.

As shown in FIG. 7, the training of a Processing Service 720 for data extraction of documents containing tables or tabular data may involve a Processing Service and a Machine Learning (ML) Model Service. For example, the Processing Service 720 may feed images to an Image Pre-processing Service 712. The Image Pre-processing service 712 may process images (pre-processed images) and output the pre-processed images to the Processing Service 720. The Processing Service 720 may feed the pre-processed images to the ML Model Service 710, and the ML Model Service 710 may analyze, using an ML Model 714, the pre-processed images and output page numbers and mapping of financials based on the analysis. Furthermore, in some embodiments, and as shown in FIG. 7, the preprocessed images may be stored in a Cache 716, and the Processing Service 720 may pull select images from the Cache 716 when prompted. Then, the Processing Service 720 may feed the selected images to the ML Model Service 710 and page coordinates of tables or table areas may be output from the ML Model Service 710 (after the ML Model Service 710 analyzes the selected images using an ML Model 714) and fed back to the Processing Service 720. In some embodiments, the Processing Service 720 may pull page number and coordinates of tables or table areas in pre-processed images that are stored in the Cache 716. In some embodiments, systems/methods may use OCR to extract data from images after page numbers and page coordinates of, for example, table regions are identified (OCR Service 718). As discussed above, this process may pertain to training a Processing Service 720 and/or ML Model Service 710. The process may occur prior to the implementation of, for example, the data extraction process described and shown in FIGS. 4 and 6.

Following the training of the Processing Service 720, the Processing Service 720 may implement methods for data extraction, such as the example method shown and described in FIG. 6. For example, a document (such as a PDF, shown as the Import PDF 722 in FIG. 7) may be imported, and images (e.g., pages) from the document may be sent to the Processing Service 720 (e.g., step 620). The Processing Service 720 may use pre-processed images and page numbers to select pages in the imported document that may contain tables or tabular data of interest (ML selected pages 724). In some embodiments, a user may evaluate the selected pages (selected via machine learning/artificial intelligence) and correct the identified/selected pages (User correction 726). The Processing Service 720 may use the page numbers of the selected pages to further identify page coordinates of predicted tables, such as financial tables (ML snipping 728). In some embodiments, the Processing Service 720 may use methods/processes shown in FIG. 6 to identify the page coordinates of predicted tables. Additionally, or alternatively, in some embodiments, a user may evaluate the predicted tables and correct if necessary (User correction 729).

Furthermore, as shown in FIG. 7, the architecture may involve continuously training the Processing Service 720 (or a second Processing Service 730) based on both the pre-processing training and the process involving potential user correction. The machine learning model may learn from each iteration of the process discussed above with respect to the imported document and data extraction. For example, as shown in FIG. 7, information related to the incorrect detection of pages or table coordinates and/or the coordinates of the predicted table(s) may be fed to a second Processing Service 730. An ML Training Scheduler 744 may invoke training at periodic or specific times, adjusting the learning rate of the models discussed herein. The Processing Service 730 may be in communication with an ML Training Service 740 that is connected to an ML Training Database (DB) 742. The data fed to the second Processing Service 730 may be communicated to the ML Training Service 740 in the form of training data, and the ML Training Service 740 may provide the Processing Service 730 with an updated ML Model. The Processing Service 730 may be in communication with the ML Model Service 710, updating the ML Model 714 as more information is received and as the model evolves. Furthermore, as shown in FIG. 7, the ML Training Service 740 may be in communication with an ML Pipeline 746, or an end-to-end construct that orchestrates the flow of data into, and output from, a machine learning model. Although shown as discrete Processing Services 720 and 730 in FIG. 7, it is contemplated that the Processing Services 720 and 730 shown in FIG. 7 may comprise one Processing Service that is both trained prior to carrying out methods of data extraction discussed herein and continues to be trained continuously or at periodic intervals.

FIG. 8 depicts an example display of a table and a corresponding table overlay. Consistent with the potential for user correction discussed with respect to FIG. 7, embodiments of the present disclosure may present to, for example, a user a graphical user interface that displays the predicted or identified table(s) and a table overlay that includes boxes indicating a header, a final row, and/or columns. For example, as shown in FIG. 8, the example income statement of FIG. 2B is depicted with a table overlay that includes boxes around a column including row description(s) 810 and a column including corresponding numerical values 820. In some embodiments, a user activated control may be provided that can adjust, for example, the boxes around the header, final row, and/or columns. For example, as shown in FIG. 8, a drag-and-drop tool 830a, 830b is shown as a user activated control. Although a drag-and-drop tool 830a, 830b is shown by example, it is contemplated that any suitable user activated control may be implemented. Non-limiting examples of such user activated controls may include a drag-and-drop tool, lasso tool, a toggle switch, and/or one or more locations for inputting or adjusting coordinates.

As discussed above, embodiments of the present disclosure may reproduce and store the table using the extracted text/data. FIG. 9 depicts an example of a reproduced table 900, incorporating elements from the tables shown in FIGS. 2A-2C. As shown in FIG. 9, particular rows may be reproduced. However, in some embodiments, all rows of identified tables in a document or financial statement may be reproduced into, for example, a single table. The reproduced table may follow a structured format such that information may be organized and presented based on particular groups or groupings (e.g., assets, liabilities, stockholder's equity, income, cash flows). Furthermore, it is contemplated that systems and methods discussed herein may use natural language processing (NLP)—such as semantic similarity—to conform each row description to a common row description, conform each header to a common header, and/or conform each numerical value to a uniform numerical value type (e.g., presenting a numerical value in thousands or millions). This may provide the system or a user with an efficient, efficacious way to compare items of interest (e.g., assets, liabilities, stockholder's equity, income, cash flows) of a corporation across time periods (e.g., months, years, decades), which may be useful in evaluating the financial health/standing of the corporation. Furthermore, in some embodiments, this may provide the system or a user with an efficient, efficacious way to compare items of interest between corporations, which may be useful in evaluating, for example, which corporations to invest in.

Additionally, or alternatively, systems/methods of the present disclosure may, using the processes discussed herein, transform a table or table region in an image or document that is otherwise illegible to other systems into a reproduced, structured table that can be consumed or ingested by other systems and further processed. Thus, systems/methods discussed herein may provide other systems with a more accurate or reliable representation of information contained in a table or table region of a document, minimizing errors in later processing.

As an example, a system, consistent with systems discussed herein, may ingest financial statements of a particular corporation over multiple different years. The system may identify tables of interest, extract the data located in the tables of interest, and reproduce the tables in a structured format. Another system (or the same system) may ingest the reproduced tables in the structured format, process the data in the reproduced tables, and output a comparison or prediction of the financial health/standing of the particular corporation. The translation or transformation of the identified table to a reproduced table in a structured format by the system may normalize the identified tables, allowing other systems (or the same system) to more reliably ingest the data within the identified tables for the further processing.

The foregoing description has been presented for purposes of illustration. It is not exhaustive and is not limited to precise forms or embodiments disclosed herein. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A computer-implemented system comprising:
  a non-transitory computer readable medium configured to store instructions; and
  at least one processor configured to execute the instructions to perform operations comprising:
    obtaining, from at least one data store, at least one document associated with at least one entity;
    identifying, using an object detection algorithm, at least one table located on the at least one document, wherein the object detection algorithm is trained using a dataset including tables from a plurality of other documents;
    extracting, using optical character recognition, text within the identified at least one table based on predicted coordinates of the at least one table;
    reproducing the at least one table using the extracted text by:
      identifying at least one header of the at least one table, wherein the identification of the at least one header includes reverse iterating through the extracted text to identify a line containing a valid header row using natural language processing, and wherein the line containing the valid header row is located outside the predicted coordinates of the at least one table;
identifying a final row of the at least one table;
identifying, using a sliding window technique, columns of the at least one table; and
presenting the extracted text in rows and columns; and
storing the reproduced at least one table in a database.

2. The computer-implemented system of claim 1, wherein the object detection algorithm includes a feed-forward convolutional neural network.

3. The computer-implemented system of claim 1, wherein the sliding window technique comprises:
calculating a mean character width of each line of the extracted text;
comparing a character width between each word in a line of the extracted text to the mean character width of the line; and
merging words with the character width less than or equal to the mean character width of the line, wherein the merged words correspond to a column.

4. The computer-implemented system of claim 1, the operations further comprising:
providing a graphical user interface to a user;
displaying, using the graphical user interface, the identified at least one table;
displaying, using the graphical user interface, a table overlay including boxes indicating one or more of the at least one header, the final row, and the columns; and
providing, using the graphical user interface, a user activated control.

5. The computer-implemented system of claim 4, wherein the user activated control is configured to adjust one or more of the identified at least one header, the final row, and the columns based on a user input.

6. The computer-implemented system of claim 1, wherein the at least one processor is configured to execute the instructions offline.

7. The computer-implemented system of claim 1, wherein the natural language processing includes:
converting at least one extracted word of the extracted text into at least one numerical vector;
comparing the at least one numerical vector to existing numerical vectors, the existing numerical vectors corresponding to common header words;
identifying an existing numerical vector of the existing numerical vectors based on a minimum difference between the at least one numerical vector and the existing numerical vectors; and
associating the at least one extracted word with a common header word corresponding to the identified existing numerical vector.

8. The computer-implemented system of claim 7, wherein a column associated with the at least one extracted word is determined to include data of a type associated with the common header word.

9. The computer-implemented system of claim 1, wherein the at least one document includes a scanned document.

10. A computer-implemented method comprising:
obtaining, from at least one data store, at least one document associated with at least one entity;
identifying, using an object detection algorithm, at least one table located on the at least one document, wherein the object detection algorithm is trained using a dataset including tables from a plurality of other documents;
extracting, using optical character recognition, text within the identified at least one table based on predicted coordinates of the at least one table;
reproducing the at least one table using the extracted text by:
identifying at least one header of the at least one table, wherein the identification of the at least one header includes reverse iterating through the extracted text to identify a line containing a valid header row using natural language processing, and wherein the line containing the valid header row is located outside the predicted coordinates of the at least one table;
identifying a final row of the at least one table;
identifying, using a sliding window technique, columns of the at least one table; and
presenting the extracted text in rows and columns; and
storing the reproduced at least one table in a database.

11. The computer-implemented method of claim 10, wherein the object detection algorithm includes a feed-forward convolutional neural network.

12. The computer-implemented method of claim 10, wherein the sliding window technique comprises:
calculating a mean character width of each line of the extracted text;
comparing a character width between each word in a line of the extracted text to the mean character width of the line; and
merging words with the character width less than or equal to the mean character width of the line, wherein the merged words correspond to a column.

13. The computer-implemented method of claim 10, the method further comprising:
providing a graphical user interface to a user;
displaying, using the graphical user interface, the identified at least one table;
displaying, using the graphical user interface, a table overlay including boxes indicating one or more of the at least one header, the final row, and the columns; and
providing, using the graphical user interface, a user activated control.

14. The computer-implemented method of claim 13, wherein the user activated control is configured to adjust one or more of the identified at least one header, the final row, and the columns based on a user input.

15. The computer-implemented method of claim 10, wherein the at least one processor is configured to execute the instructions offline.

16. The computer-implemented method of claim 10, wherein the natural language processing includes:
converting at least one extracted word of the extracted text into at least one numerical vector;
comparing the at least one numerical vector to existing numerical vectors, the existing numerical vectors corresponding to common header words;
identifying an existing numerical vector of the existing numerical vectors based on a minimum difference between the at least one numerical vector and the existing numerical vectors; and
associating the at least one extracted word with a common header word corresponding to the identified existing numerical vector.

17. The computer-implemented method of claim 16, wherein a column associated with the at least one extracted word is determined to include data of a type associated with the common header word.

18. The computer-implemented method of claim 10, wherein the at least one document includes a scanned document.

\* \* \* \* \*